M. JOHNSON.
CULTIVATOR.
No. 105,460.
Patented July 19, 1870.
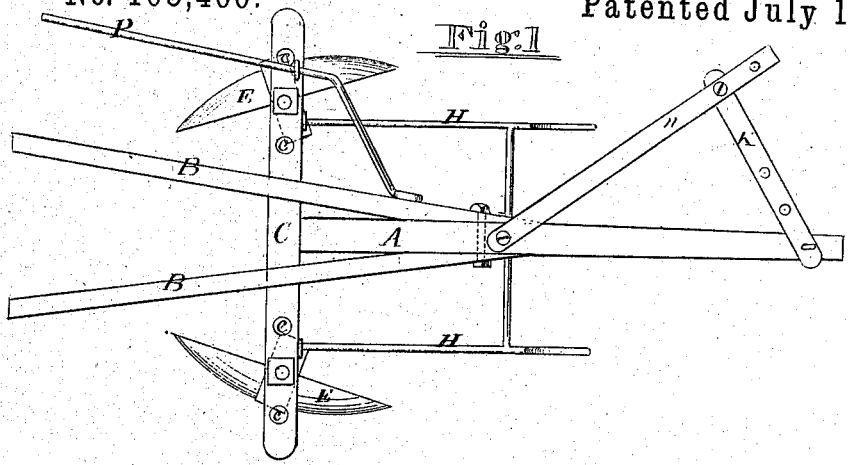
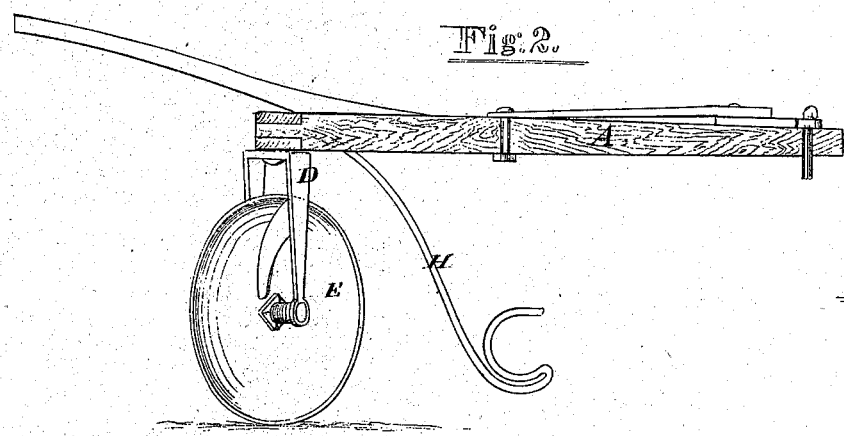
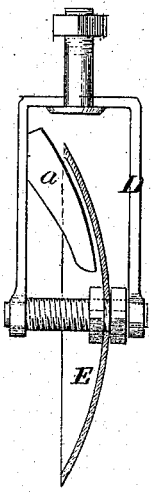
Witnesses.
Chas Kenyon
Edw.d Mase
Inventor.
Moses Johnson
Chipman Hosmer & Co
Attorneys.

United States Patent Office.

MOSES JOHNSON, OF THREE RIVERS, MICHIGAN.

Letters Patent No. 105,460, dated July 19, 1870.

IMPROVED CULTIVATOR.

The Schedule referred to in these Letters Patent and making part of the same.

*To all whom it may concern:*

Be it known that I, MOSES JOHNSON, of Three Rivers, in the county of St. Joseph and State of Michigan, have invented a new and valuable Improvement in Cultivators; and I do hereby declare that the following is a full, clear, and exact description of the construction and operation of the same, reference being had to the annexed drawing making a part of this specification, and to the letters and figures of reference marked thereon.

Figure 1 of the drawing is a top view of my invention.

Figure 2 is a central vertical section.

Figure 3 is a detailed view.

My invention relates to cultivators, and consists in certain improvements upon the cultivator part of my combined potato-digger and cultivator patented August 3, 1869, by which said device is intended to be made more generally useful and effective.

A of the drawing represents the beam of my improved cultivator;

B, the main handles; and

C, the main beam or cross-bar.

To the cross-bar C I arrange staples, D, in which I arrange the concave disks E, in such manner that their concave sides shall be turned outward, and they be allowed to rotate on suitable bearings.

I also arrange scrapers, *a*, on the concave sides of these disks. I also make the position of these disks adjustable by means of apertures through the bar C, through which apertures, respectively, I pass the heads of staples D, and make said staples removable by means of the threads and nuts that hold them upon the cross-bar.

The apertures above mentioned are marked *c* on the drawing. By adjusting the heads of staples D in the apertures desired, the track of the cultivating-disks may be made wide or narrow at will.

It will also be observed that the angle of said disks with relation to the cross-beam may be regulated to the will of the operator by means of the threads and nuts on the ends of the staples above the cross-bar.

The letters H represent guards or scrapers, arranged in front of the disks E, as shown. They consist of strong wires or strong steel bars, bent into the shape represented. They are sufficiently strong to serve as means for pulling up and removing weeds and ordinary obstructions, but still are not too rigid to serve as springs, and pass over bowlders and the like, without stopping the forward movement of the cultivator.

To the front end of the beam A I attach a brace or lever, K, perforated, as shown, and connect said brace both to said beam and the draw-bar N by means of pivot pins.

The draw-bar N is pivoted at its rear end to the plow-beam, and at its front end to the brace K, in the manner shown, and the distance of its front end from the plow-beam is regulated, at will, by means of the apertures *c* in the brace, and the pivot-pin by which said brace is united with said plow-beam.

P represents an auxiliary and movable plow-handle, connected with the beam and handles in the manner shown on fig. 1.

The object secured by the brace K, draw-bar N, and auxiliary handle P is as follows, namely:

Whenever it is found desirable to straddle a row of plants with the cultivator, and thereby cultivate more closely to the hills, I attach the animal or animals by which it is moved to the end of the draw-bar N, and guide the cultivator by means of the auxilary handle P and the cultivator-handle next adjoining.

In order to overcome the difficulty of moving the cultivator in a straight line, when the line of draft is transferred from the end of the plow-beam to the draw-bar N, I arrange the plowing-disks in such manner that the left-hand disk shall be adjusted at a more acute angle than its fellow, and thereby create a greater power of resistance, by plowing a broader furrow.

What I claim as my invention, and desire to secure by Letters Patent, is—

The cultivator herein described, having cross-bar C, staples D, disks E, scrapers *a* and H, brace K, draw-bar N, and auxiliary handle P, when constructed and arranged to operate as and for the purposes specified, as an improvement upon my patent of August 3, 1869.

In testimony that I claim the above, I have hereunto subscribed my name in the presence of two witnesses.

MOSES JOHNSON.

Witnesses:
E. H. LOTHRUP,
E. H. LOTHRUP, 2d.